M. F. GALE.
VALVES FOR WATER CLOSETS.
No. 190,304.      Patented May 1, 1877.
Fig: 1.       Fig: 2.
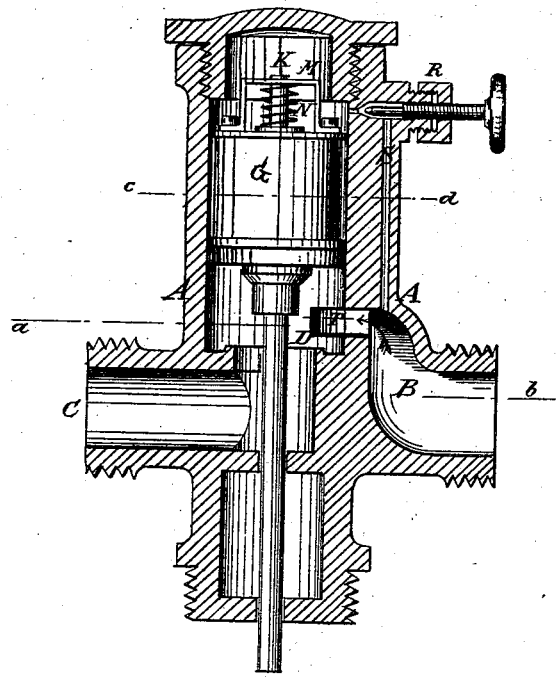 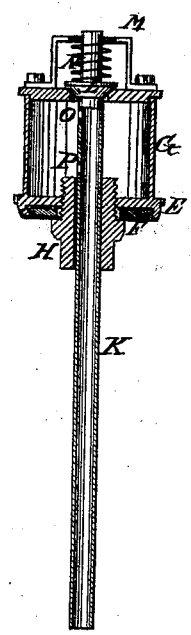
Fig: 3.       Fig: 4.
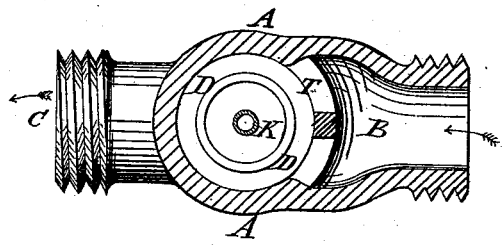 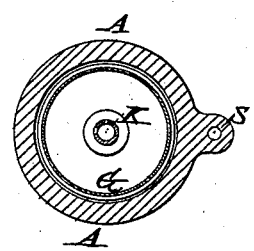
Witnesses:
John W. Ripley
Boyd Eliot
Inventor:
Moses F. Gale

UNITED STATES PATENT OFFICE.

MOSES F. GALE, OF BROOKLYN, E. D., NEW YORK.

IMPROVEMENT IN VALVES FOR WATER-CLOSETS.

Specification forming part of Letters Patent No. 190,304, dated May 1, 1877; application filed October 26, 1876.

*To all whom it may concern:*

Be it known that I, MOSES F. GALE, of Brooklyn, E. D., county of Kings, and State of New York, have invented a new and useful Improvement in Valves for Water-Closets, &c., which improvement is fully set forth in the following specification, reference being had to the accompanying drawings.

This invention pertains to that class of valves connected with water-closets that furnish an after-flow of water to sluice the pan or hopper, as the case may be; and the invention consists in combining with the sluice-valve a hollow cylinder, which serves as a variable chamber to govern the flow of the water, the said cylinder having a valve in its upper end, and arranged within a casing provided with a vertical passage communicating with the inside of the casing above the floating chamber. The valve in the upper end of the said chamber is operated by a hollow stem having one or more openings, the functions and operation of which will be fully hereinafter described.

Figure 1 is a vertical section of the valve-chamber, showing the variable chamber in elevation. Fig. 2 is a vertical section of the variable chamber and its plug-stem. Fig. 3 is a transverse section through *a b* of Fig. 1, and Fig. 4 is a transverse section through *c d* of Fig. 1.

At A is shown the valve-casing proper, with inlet-openings at B and outlet at C. The valve-seat is shown at D, and the valve for closing the same at E, and is faced with some elastic substance, as leather or rubber, as shown at F in the section at Fig. 2. Upon the back of the valve there is formed a cylindrical chamber, as at G, which may be cast on the valve, or otherwise attached thereon, and its exterior is formed to fit snugly in a chamber within the valve-casing, said chamber being long enough to permit the chamber G to move endwise therein sufficiently far to open the sluice-ways to their greatest capacity. Said chamber G is made water-tight, or nearly so, by a screw-plug at its lower end, as at H, through which passes a plug-stem, K, which has near its upper end a conical plug-valve, L, that closes a small opening in the upper end of the chamber G, as plainly shown in Fig. 2, and upon the upper end of said chamber there is a yoke, as at M, which serves to hold a spiral spring, as at N, around the upper end of the plug-stem K, and between the yoke and the back of the conical valve, thereby tending to keep said valve closed upon the upper end of the chamber G. The plug-stem K is hollow, and has two openings, as at O and P, from the interior of the chamber G, to permit the escape of the water that may pass into the chamber through the conical valve L. At R there is a screw-plug, operated by a hand-wheel to close a passage, as at S, from the inlet-pipe to the upper end of the chamber of the valve and over the chamber G, and through said passage S water is admitted to press upon the plug-valve L and the chamber, and thereby assist in closing the inlet-passage at B. Said inlet-passage is simply a long slit formed in the side of the valve-chamber A, a plan of it being shown at T, Fig. 3, and said slit is some distance above the valve-seat proper, so that as the cylinder G descends its lower end passes the slit or opening, and gradually cuts off the flow of water, and thereby prevents what is termed the "water-hammering" in the pipes.

The valve E is provided with a conical plug on its lower side, smaller in diameter than the valve itself, so that when seated in the seat D it will leave a small space between the valve E and seat D, and the valve is so constructed relative to the inlet T that when fully down it will not completely close said inlet, but will leave a sufficient passage for the water into said space to serve to raise said valve, as hereinafter explained.

The action of these several devices will now be easily understood from a brief explanation.

The valve is connected inside of the chest or receiver, and pressure being applied to the lower end of the stem K by a lever and handle, (not here shown, but of any well-known construction,) the small plug-valve at L is easily raised, while the cylinder G and its valve at E remains at rest on the seat at D. But as soon as the chamber G is opened at the top the water above in the valve-chamber will flow into the chamber G, and the pressure being thereby relieved above, the pressure in the pipes at B will instantly raise the chamber, and thereby open the valve at D, and thereby cause the sluicing action to begin, and the action will continue until the water in the chamber above has accumulated again through the small plug-cock at R, and thereby make the pressure the same on both ends of the cylinder G, when it will gravitate to its seat at D, and in doing so will slowly pass the inlet-slit at B, and thereby so slowly cut off the flow as to prevent hammering in the pipes from the reaction of the flow. In the meantime the water in the cylinder G will escape at the holes O and P, through the hollow stem K, and the chamber will be thereby emptied ready for the next action.

The screw-plug at R may be set to regulate the flow of the water into the chamber above the cylinder G in such quantities as to vary the after-flow to any desired length.

It is evident that such a valve may be easily inverted and adapted to a hopper-closet with a spring-seat.

I therefore claim—

The combination, with the casing A, having the passage S, of the plug-valve L, spring N, hollow stem K, having one or more openings or outlets, P, and the cylinder G, as and for the object specified.

MOSES F. GALE.

Attest:
 JOHN W. RIPLEY,
 BOYD ELIOT.